United States Patent [19]
Eisenberg

[11] 3,985,969

[45] Oct. 12, 1976

[54] SIMULATED COMMUNICATIONS SYSTEM

[75] Inventor: Robert M. Eisenberg, Woodbine, Md.

[73] Assignee: The Singer Company, Binghamton, N.Y.

[22] Filed: Aug. 14, 1975

[21] Appl. No.: 604,568

[52] U.S. Cl. .......................... 179/15 A; 179/15 AW
[51] Int. Cl.² ............................................ H04J 3/00
[58] Field of Search ...... 179/15 AL, 15 AQ, 15 AT, 179/15 A, 15 AW, 15 BM, 15 BD; 340/172.5, 166 R

[56] References Cited
UNITED STATES PATENTS

| | | | |
|---|---|---|---|
| 3,692,942 | 9/1972 | Inose | 179/15 A |
| 3,720,790 | 3/1973 | Watson | 179/15 AL |
| 3,870,825 | 3/1975 | Roberts | 179/15 AL |
| 3,924,079 | 12/1975 | Garrett | 179/15 AQ |

*Primary Examiner*—David L. Stewart
*Attorney, Agent, or Firm*—Ronald Reichman; James C. Kesterson

[57] ABSTRACT

This invention is drawn to a system which simulates a communications system among a plurality of independent vehicles. The simulated system utilizes pulse width modulation to reduce noise and eliminate crosstalk. In addition, the simulated communications system includes a network having computer-controlled switches which automatically determine which simulated vehicles are sufficiently close to be in communication range with each other and which are not. Thus, this disclosure describes a system which is maintained under digital control and which utilizes pulse modulation to carry the actual transmission of intelligence.

7 Claims, 4 Drawing Figures

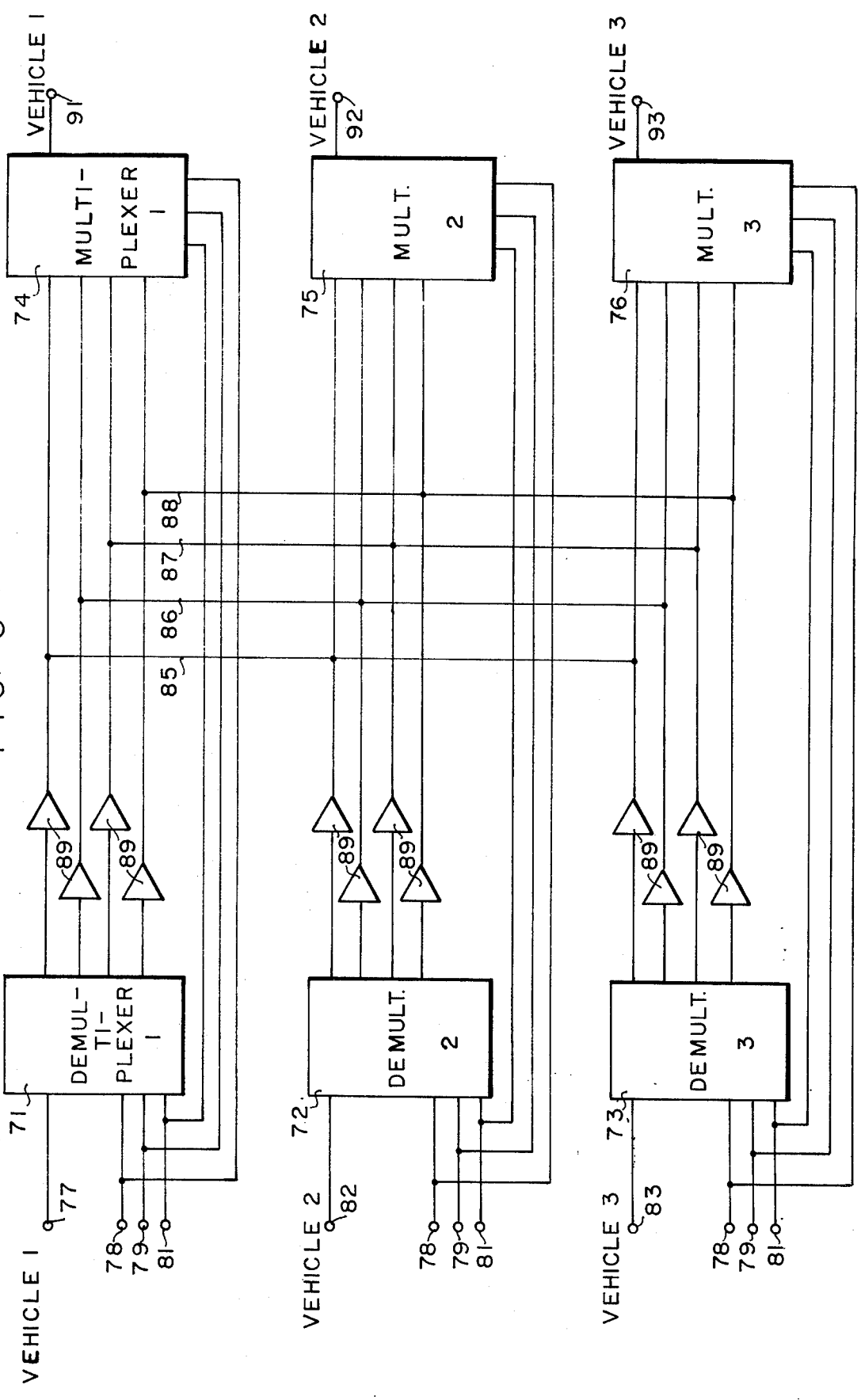

SIMULATED COMMUNICATIONS SYSTEM

BACKGROUND OF THE INVENTION

1. Field of the Invention

This invention relates to simulated communication systems and, more particularly, to a communication network which simulates an actual communication system among a plurality of independent vehicles.

2. Description of the Prior Art

In the past, simulated communications system such as those which were incorporated in simulated aircraft and in systems which utilized a plurality of simulated vehicles usually comprised direct wire connections among the various communication units. In a more complex system which represents a relatively large number of independent vehicles each of which has several communications channels, the number of direct wire connections becomes too complex for economic design and manufacture.

SUMMARY OF THE INVENTION

This invention overcomes many of the disadvantages of the prior art by utilizing a pulse width modulation system to eliminate cross-talk and noise and by multiplexing the information carried by the various channels to eliminate the large amount of wiring required in prior art communications systems. In addition to the above, this invention includes digitally controlled switching means for connecting together a plurality of channels into one or more communication networks which may be changed from time to time in accordance with changing simulated conditions.

It is an object of this invention to provide a new and improved communications system.

It is another object of this invention to provide a new and improved simulated communications system.

It is a further object of this invention to provide a new and improved electronic system which provides for communication from among a relatively large number of independent information sources.

Other objects and advantages of this invention will become more apparent as the following description proceeds, which description should be considered together with the accompanying drawings.

BRIEF DESCRIPTION OF THE DRAWINGS

FIG. 3 is a block and schematic drawing of a portion of the system of this invention.

DETAILED DESCRIPTION OF THE DRAWINGS

As mentioned above, prior art communications systems utilized direct wiring including switching among directly wired components to achieve the various interconnections required in the simulated system.

Figure 1:
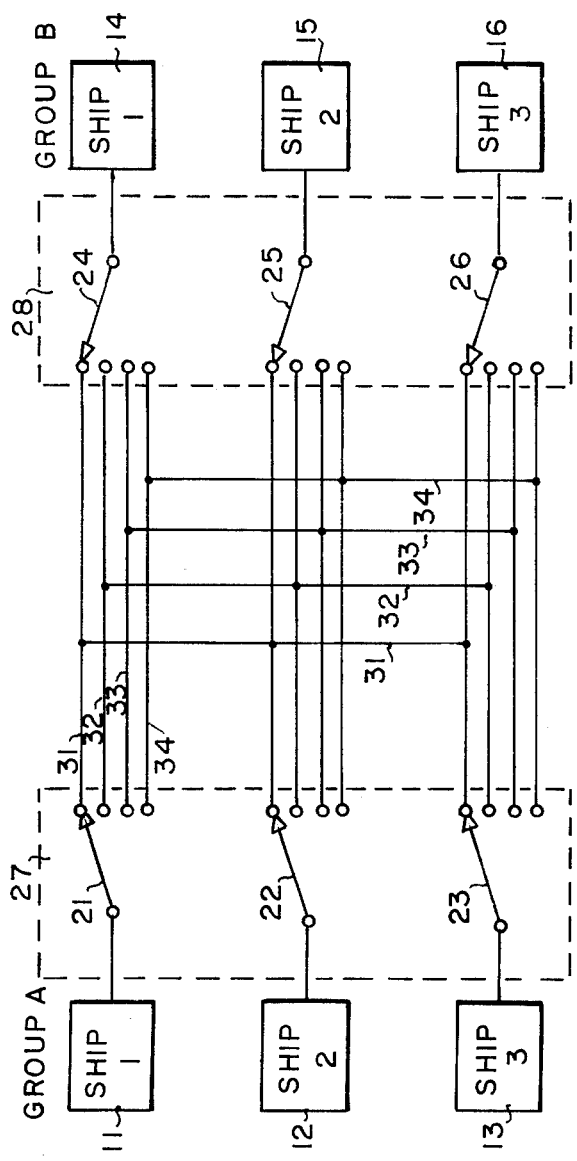
FIG. 1 is a block and schematic circuit diagram of a typical communication network among a plurality of vehicles.

In FIG. 1, two groups of vehicles are shown; one being designated as group A and the other being designated as group B. Each group comprises three separate vehicles as shown. For the purposes of this description, it will be assumed that the vehicles of each group are sufficiently close to each other to be in continual communication with each other, whereas the vehicles of the two different groups may or may not be sufficiently close to be in communication with the vehicles of the other group. Group A comprises a ship 11, a ship 12, and a ship 13; group B comprises a ship 14, a ship 15 and a ship 16. Each ship has available to it four separate communications channels which are identified in FIG. 1 as 31, 32, 33 and 34. Associated with the ships of group A is a switching complex 27 comprising four-positioned switches 21, 22 and 23. Associated with the ships of group B is a switching complex 28 comprising four-positioned switches 24, 25 and 26. The four positions of each of switches 21–26 are connected to one channel of the four-channel network comprising 31, 32, 33 and 34.

Each ship may connect its individaul ship to any one of the four channels at the choice of the ship trainee. For example, switch 21 is connected to ship 11 and, at the option of the trainee in ship 11, the switch may be set to any of the four channels 31–34. When ship 11 is connected to one channel (for this discussion assume channel 31), it provides two-way communication with every other ship which is connected to the same channel. Thus, if ship 12 through switch 22 is connected to channel 31 also, communications are established between ships 11 and 12. Should ship 14 also be connected through switch 24 to channel 31, then it is also connected for communications to ships 11 and 12. In a simulated problem, however, ship 14, which belongs to group B, may be too distant from ships 11 and 12 (which belong to group A) to be in communication with those ships. In the prior art systems, there is no way in which such communications could be prevented unless restrictions were placed upon which channels could be utilized by the individual operators — and restrictions of this nature did not provide good training — or the various networks were so interconnected by a large number of additional lines and switching devices that clean separation of the communications between the two groups was made possible.

To overcome some of these problems, the present invention utilizes a multiplexed arrangement of communications wherein each ship's communication is sampled at a particular time and the pulse sampled is modified in width in accordance with the amplitude of any communication appearing on the particular channel at that instant. Thus, the signal from any channel will appear as a train of spaced pulses of varying width which can be later constructed into a smooth curve by suitable integration devices.

Figure 2:
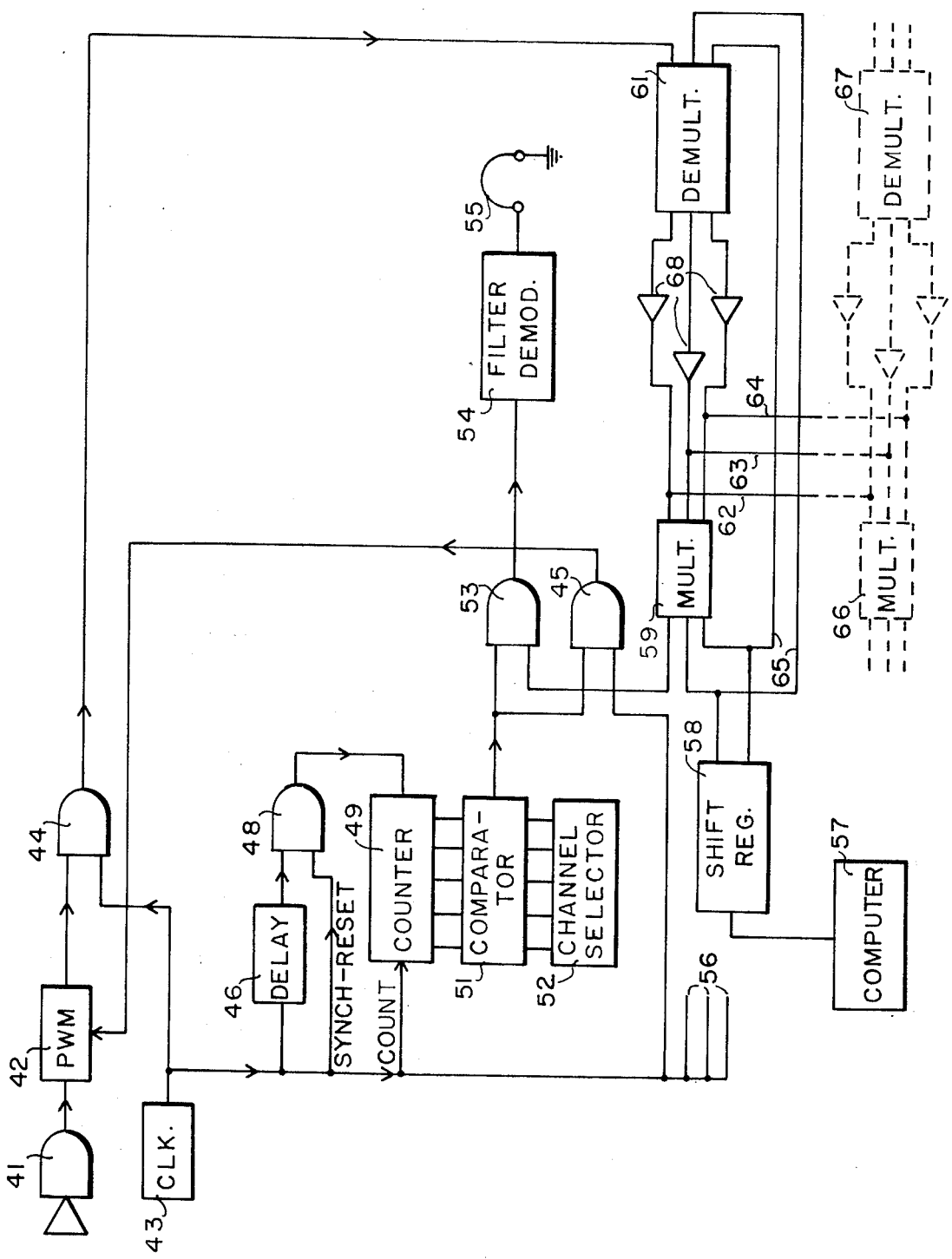
FIG. 2 is a block diagram of one overall system according to this invention.

FIG. 2 is a block diagram of one of several arrangements used in the system of this invention. Shown is only one arrangement because for each vehicle there should be a similar, duplicate arrangement. However, it is not necessary to duplicate the description of similar elements for the purposes of this specification. A microphone 41 receives the voice signals from the student or operator and its output (suitably amplified if desired) is applied to the input of a pulse width modulator 42. The output of the pulse width modulator 42 is applied as one input to an OR gate 44 whose output is one input to a demultiplexer 61. The other input to the OR gate 44 comes from a clock 43 whose output is also supplied as an input to a delay 46, a reset pulse input to an AND gate 48, to the count input of a counter 49, and by lines 56 to similar devices in the apparatus for the other vehicles in the system. The clock 43 is a central component for the entire system of this invention. The output of the delay 46 is applied as the other input to the AND gate 48 whose output is applied to the clear input of a counter 49. The outputs of the counter 49 are taken in parallel from each of its stages and are applied to one set of inputs of a comparator 51, to which a second set of inputs is applied from a channel selector 52. The output of the comparator 51 is applied as an input to each of the two gates 45 and 53. The output of the gate 45 is applied to a control input of the pulse width modulator 42, and the output from the gate 44 is applied as an input to a demultiplexer 61. The input to gate 53 is the output from the multiplexer 59. The output from the gate 53 is applied through a demodualator 54 to the earphones 55 or other sound reproducing equipment. The inputs to the multiplexer 59 and the outputs from the demultiplexer 61 are applied to a plurality of channels 62, 63 and 64 in parallel. These channels also are connected to the demultiplexer outputs and the multiplexer inputs of other vehicles shown here in dashed form at 66 and 67. Control of the channel system is handled by a computer 57 whose output is applied through the shift register 58 to the multiplexer 59 and the demultiplexer 61 over a pair of wires 65.

The systems of this invention is used where communications among a plurality of communication points may use similar or identical communication channels both by direct selection and by external control. In a situation where the operation of a plurality of ships comprising two separate groups is being simulated and where the two groups of ships are too far apart to be in direct communication with each other, the ships of the two groups may use the same channels without the ships of one group communicating with the ships of the other. To accomplish this, particularly in the case where the two groups of ships may gradually move into range of each other's communication equipment, the overall system is under the control of the computer 57. The shift register 58 is interposed between the computer 57 and the rest of the system to store the computer-controlled output so that the computer 57 may be released to carry on its other activities. The output from the computer 57 when applied to the multiplexer 59 and the demultiplexer 61 determines to which channel these pieces of equipment will be connected from time-to-time. As illustrated in FIG. 2, there are three channels 62, 63 and 64 in the example shown. But before continuing this line of description, it would be better to describe the operation of the other components.

The voice signals from the microphone 41 are applied to the pulse width modulator 42 which samples the output of the microphone 41 at discrete intervals determined by the output from the gate 45. Each time the output of the microphone 41 is sampled, the width of the sampling pulse is varied in proportion to the amplitude of the audio at that point in time. Thus, the output from the modulator 42 is a train of pulses whose widths vary in proportion to the amplitude of the voice signal. In this manner, the intelligence is carried by the width of the pulses. By applying a clock pulse from the clock 43 to the other input of the gate 44, the passage of the pulses from the modulator 42 is synchronized with the clock pulses for the rest of the system. The variable width pulses are formed whenever an output signal is generated by the comparator 51. The operator or trainee selects his channel from the choice of channels provided him in his vehicle by using the channel selector 52. The channel selector 52 may be a register which stores pulses from a dial, or the setting of a plurality of switches, or any other suitable channel selection means, and it applies a numerical value to one side of the comparator 51. The inputs to the other side of the comparator 51 comes from the counter 49 which counts the pulses from the clock 43. When the two inputs to the comparator 51 are identical, the comparator generates an output signal which opens the gate 45 to trigger the modulator, and the modulated pulse to the demultiplexer 61 via gate 44, it is also applied to the gate 53 to supply the output of the multiplexer 59 to the input of the demodulator 54. The demodulator 54 passes audio to the speaker or earphones 55 in the vehicle.

The channel selector 52 selects the time during which the information from the multiplexer 59 is applied to the filter 54 and when the output of the microphone 41 is applied to the demodulator 61. In other words, the channel selected by the channel selector 52 is really a time channel, not a physical communication channel. The channel selector 52 selects a number which is applied to one side of the comparator 51, and, at the time when the counter 49 contains an identical number, the comparator 51 generates the output signal which opens the two gates 45 and 53. The channels 62, 63 and 64 are physical channels — they are channels which contain separate wires. The channels 62-64 are the communication channels to which the other vehicles are also connected. The computer 57, by means of the signals it applies through the shift register 58, determines which of the multiplexers and demultiplexers of each of the vehicles is connected to the channel 62, or to the channel 63, or to the channel 64. This provides two separate channel selection means in the system. One of these two means is the time channel means and the other is the physical channel means. It is by this division of the two types of channels that vehicles may be connected, insofar as the trainees are concerned to the same communication channel and still not be in communication with each other.

FIG. 3 illustrates one manner in which a plurality of vehicles may be connected to a similar plurality of communications channels. In FIG. 3 are shown three vehicle communications apparatus including a demultiplexer 71 and a multiplexer 74 for vehicle 1; a demultiplexer 72 and multiplexer 75 for vehicle 2, a demultiplexer 73 and a multiplexer 76 for vehicle 3, and communication channels 85, 86, 87 and 88. For decoupling purposes, the demultiplexers 71, 72 and 73 are connected to the communication channels 85-88 by means of buffers 89. Each demultiplexer 71-73 has connected to its input a data input terminal 77, 82 and 83, and three control or selection terminals 78, 79 and 81. The three select terminals are connected to all of the demultiplexers 71-73 and to all of the multiplexers 74-76 in parallel. Each of the multiplexers 74-76 has a data output terminal 91, 92 and 93 connected to it.

In operation, the computer 57 of FIG. 2 transmits an address code along the three selection lines 78, 79 and 81 to select the communications channel 85-88 to which it is connected. In other words, assume that the computer 57 is a part of a simulator as are the vehicles 1, 2 and 3. The instructor lays out a problem in which the individual vehicles are positioned in prescribed locations in the gaming area, which may be quite large. In many cases, the individual vehicles are out of range of each other's communications systems. Assume for this description that vehicles 1 and 2 are in range of each other and are communicating, and assume that vehicle 3 is out of range of both vehicles 1 and 2 but is communicating with stations not shown in FIG. 3. In the situation set forth, all three vehicles could be on the same communication channel. It is normal for the individual using the equipment to chose channel 1 as selected by the selection means in the vehicle. The computer 57 is programmed to compute the distances among them to determine when the separate vehicles are in or out of range of one another. Thus, when the vehicles 1 and 2 are out of range of the vehicle 3, the computer must take this into account and prevent vehicle 3 from communicating with the other two even though they may all have selected the same channel within the vehicles. As described above, the selection of the channel within the vehicle is really a selection of a time slot. This is achieved by the use of the counter 49 driven by the clock 43 and the comparator 51 to select the time for the channel selected by the operator. Thus, the operators in the three vehicles being described select the same time slot. Since the computer 57 is aware that vehicle 3 is out of range of the other two vehicles, it signals the demultiplexer 73 and the multiplexer 76 along the select lines 78, 79 and 81 to select a channel other than that used by the vehicles 1 and 2. Assume for this discussion that vehicles 1 and 2 are communicating on channel 85 which is selected by the demultiplexers 71 and 72 and by the multiplexers 74 and 75 in response to the signals from the computer 57. The computer will apply to the select lines of the demultiplexer 73 and of the multiplexer 76 a different combination of signals so that the vehicle 3 will be connected to channel 86. Should there be additional vehicles (and it is contemplated that there will be several more vehicles in the system), they will be connected by the computer 57 to other channels. The computer 57 is in a position to change the channels to which any of the vehicles is connected by a pulse-by-pulse basis.

Figure 4:
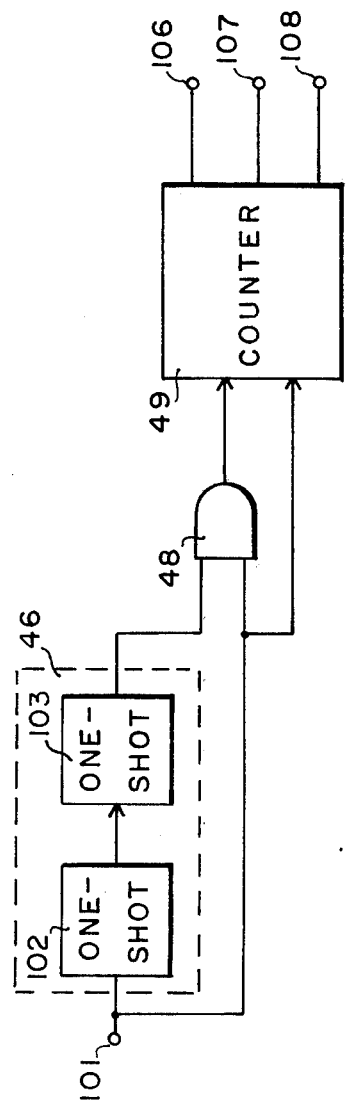
FIG. 4 is a block diagram of a synchronizing network for use in this invention.

FIG. 4 shows some details of the means used to synchronize and reset the counter 49. The clock information is supplied to the input terminal 101 which provides an input to the delay 46. The delay 46 comprises two cascaded one-shots 102 and 103 with the input to the one-shot 102 coming from the terminal 101 and the input to the one-shot 103 coming from the output of the one-shot 102. The output of the one-shot 103 is applied as one input to the gate 48, the output of which serves to reset the counter 49. The other input to the gate 48 is connected directly to the input terminal 101 which also applies a signal to the count input of the counter 49. The counter 49 shown in FIG. 4 is a three-stage counter which has three outputs applied in parallel to the output terminals 106, 107 and 108.

Assume for this discussion that six channels are provided in each vehicle from which the operator is to communicate. For each count of six, the counter 49 should be reset to zero. Thus, the operator selects a channel, and the pulses from the clock 43 are applied to the input terminal 101 causing the counter 49 to count. When the counter 49 has reached a count of six, the comparator 51 will have compared all possible selections with the output of the counter 49, and the operation should repeat. To provide a reset pulse to clear the counter 49 and reset it to zero, an additional pulse is generated by the clock immediately preceding every sixth clock pulse. The clock pulse hits the one-shot 102, causing it to go into its unstable condition where it remains for a fixed length of time. When the one-shot 102 recovers and resets to its stable condition, the output pulse generated by its recovery is applied to the input of the one-shot 103, which goes into its unstable state, generating the reset signal. This is applied to one input to the gate 48 to condition that gate, and, when that signal coincides with a synchronizing pulse from the terminal 101, the gate 48 opens to supply the reset signal to the counter 49. Thus, the one-shot 102 should have an unstable cycle which is equal in time to the time required for the maximum modulated pulse width.

The apparatus of this invention provides two separate controls for selecting actual channels upon which a plurality of simulated vehicles may communicate with each other to the exclusion of other simulated vehicles. One such selection means is under the control of the student operator who selects the particular communication channel in his vehicle upon which he wishes to communicate. Normally, the student operated is presented with several channels from which he may select the one that is to be used at any time. It is assumed that other vehicles in the group of which his is a part also have selected the same communication channel by which the various vehicles may communicate. At the same time, other vehicles in other groups which may be, in the simulated problem at hand, too far from the vehicles of the first group to communicate therewith may also select the same communication channel in their vehicles. In order to prevent communication among vehicles which are out of range of each other's equipment at any particular time in any particular problem, the second selection means is under the control of the computer 57. Also, to meet the objectives of the invention to reduce the number of wires and switching devices required to provide the large number of combinations and permutations of communication channels, this invention provides the first selection means to be one in time and part of a time multiplexing system. A pulse width modulation system has been described in which each of the channels provided within the vehicle occupy a distinctive and unique interval in time in a complete operating cycle. For each of these channels which can be selected, the voice transducer is sampled at a particular time, the sample is used to modulate the width of a transmission pulse, and that pulse is then transmitted over a single pair of lines to the demultiplexing units of the system. The use of pulse width modulation virtually eliminates noise and cross-talk. Other modulated pulses resulting from voice communication over other selected channels are also transmitted over the same pair of wires at successive intervals of time. The computer-controlled portion of the system controls electronic switching devices formed into a matrix to connect together the multiplexing and demultiplexing units of the individual vehicles in accordance with the parameters of the particular mission being carried out in the simulator at any moment. The parameters of an active mission change as the mission progresses, and the computer monitors such changes to change the switching devices in the matrix a conditions change. Thus, the initial selection system is one of communication channels and the selection is made by the operator within the vehicle. The second selection system is controlled by the computer and connects together the communications from the various vehicles to provide active communication among those vehicles which are to communicate together.

The above specification has described a new and improved communications system which provides for a wide number of combinations of communication channels and devices while limiting the number of wires provided for such communication to a small number. It is realized that the principles of the invention set forth above may be utilized in a manner other than that described above after a reading of the above specification without departing from the spirit of this invention. It is, therefore, intended that this invention be limited only by the scope of the appended claims.

What is claimed is:

1. A system providing for communications among a plurality of independent communications stations, said system comprising a plurality of communications stations, a plurality of pulse width modulated communications channels, means in each station for selecting one of said pulse width modulated communications channels for transmission and reception, and computer controlled digital means for directing communications among said individual stations to provide for communication nets each comprising selected stations and to prevent communications between selected stations.

2. The system defined in claim 1 wherein said channel selection means comprises means for selecting a value representative of a channel, a counter, a source of clock pulses, means for connecting the output of said source of clock pulses to the count input of said counter, a parallel comparator having at least two sets of inputs, and means for connecting the output of each stage of said counter to one set of said inputs and for connecting said value selecting means to said other set of inputs so that said comparator generates an output signal when the values on said two sets of inputs correspond.

3. The system defined in claim 2 wherein said computer controlled digital means comprises a switching matrix having at least as many switching combinations as there are combinations of values stored in said counter, means for connecting each of said stations to the stitching devices of said matrix, a source of digital control, and means for connecting said source of digital control to said switching means of said matrix to determine which of said stations are coupled together.

4. The system defined in claim 2 wherein said computer controlled digital means includes a matrix comprising a plurality of communications nets channels and a plurality of inputs from the individual stations, said matrix further including switching means for selectively connecting each of said station inputs to each of said channels, means for connecting each of said stations to said individual switching means, a source of digital control, and means for connecting said individual switching means to said source of digital control so that said source determines which of said stations are connected to which of said communication nets channels.

5. A communications system for simulating tactical conditions and providing communications among a plurality of individual communications stations, said system comprising:
   a. a first group of communications channels comprising different intervals of time;
   b. first means at each station for selecting individual channels from said first group for transmission and reception, said first selection means being under the control of a person at each station;
   c. a second group of communications channels, said second group being formed by separate transmission paths; and
   d. second means for selecting individual channels of said second group, said second selection means being controlled by a digital computer to enable selected groups of communications stations to communicate with each other while preventing communications between selected stations.

6. The system defined in claim 5 wherein said first selection means comprises means at each station for selectively generating a numerical value representative of the channel identifications, a clock for generating increasing numerical values, a comparator, and means for applying the numerical value representative of the channels to one side of said comparator and the output from said clock to the other side of said comparator so that said comparator generates an output when the two inputs values are equal.

7. The system defined in claim 5 wherein the second selection means comprises a plurality of switching devices, means for connecting individual stations to one side of a switching means, means for connecting each of said transmission paths to a source of digital control signals, and means for connecting the output of said source of control signals to the individual switching means to connect the individual stations to the individual transmission paths under the control of said source.

* * * * *

UNITED STATES PATENT AND TRADEMARK OFFICE
CERTIFICATE OF CORRECTION

PATENT NO. : 3,985,969
DATED : October 12, 1976
INVENTOR(S) : Robert M. Eisenberg It is certified that error appears in the above–identified patent and that said Letters Patent are hereby corrected as shown below:

Col. 4, line 24, "time" is underlined in application - not in patent.

Col. 7, line 49, "communications" should be --communication-- and "channels" should be deleted.

Col. 8, line 9, delete "channels".

Signed and Sealed this

Twenty-first Day of February 1978

[SEAL]

Attest:

RUTH C. MASON
*Attesting Officer*

LUTRELLE F. PARKER
*Acting Commissioner of Patents and Trademarks*